Sept. 9, 1958        H. N. BLISS ET AL        2,851,215
LATITUDE AND LONGITUDE COUNTER
Filed Nov. 22, 1952        2 Sheets-Sheet 1
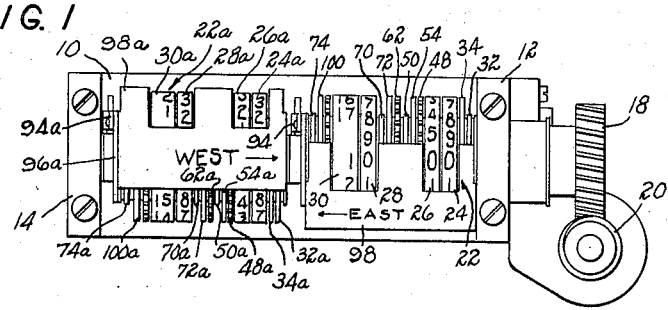
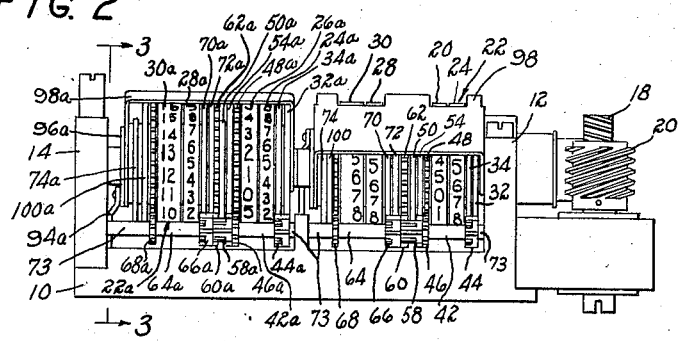
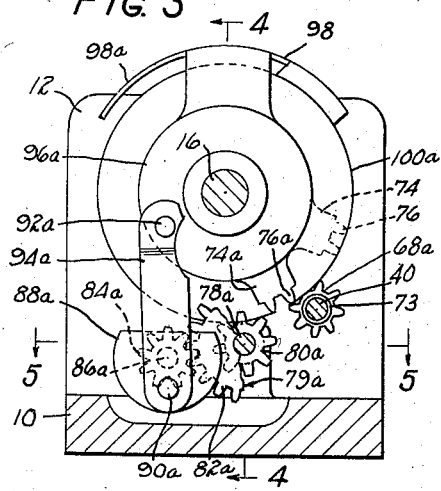
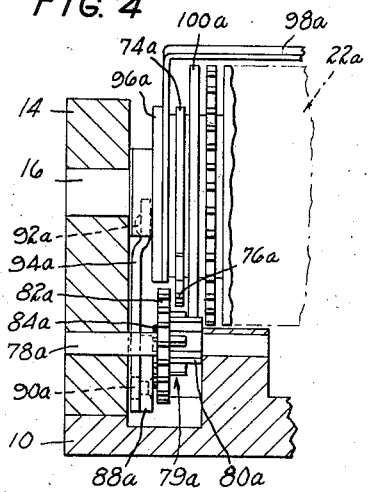
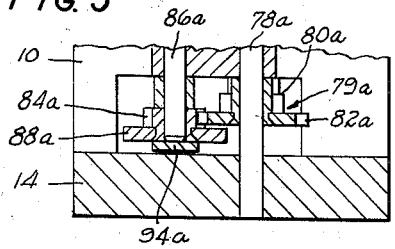
*INVENTORS*
*HARVEY N. BLISS*
*GUSTAVE L. MANKE*
BY
*Lindsey and Prutzman*
ATTORNEYS Sept. 9, 1958 H. N. BLISS ET AL 2,851,215
LATITUDE AND LONGITUDE COUNTER
Filed Nov. 22, 1952 2 Sheets-Sheet 2

INVENTORS
HARVEY N. BLISS
BY GUSTAVE L. MANKE

Lindsey and Prutzman
ATTORNEYS

United States Patent Office

2,851,215
Patented Sept. 9, 1958

2,851,215

LATITUDE AND LONGITUDE COUNTER

Harvey N. Bliss, Windsor, and Gustave L. Manke, Bloomfield, Conn., assignors to Veeder-Root Incorporated, Hartford, Conn., a corporation of Connecticut Application November 22, 1952, Serial No. 322,072

1 Claim. (Cl. 235—1)

This invention relates in general to counting devices and pertains more particularly to a latitude-longitude counter.

In counters of this type, which include two groups of numeral wheels with the numerical indicia of one group arranged in an opposite sequence from that of the other group, to avoid an improper reading of the meaningless numerical group, resort has been made to the use of a shutter mechanism for masking or shielding from view the group of wheels the reading of which is to be avoided. While in theory such a masking accomplishment appears quite simple, nevertheless in actual practice a number of difficulties have arisen which have both increased the manufacturing cost of the counters and which have led to operational difficulties.

Heretofore, the shifting of the shutter in prior art devices has been controlled in accordance with the angular positions assumed by the numeral wheels themselves, and differences in backlash of the transfer gearing contribute to both an improper positioning of the shutter mechanism and interference with the free movement of said shutter mechanism should the backlash of the gear train connected with one wheel group be different from that of the other gear train, a common happening. Further, difficulties have been encountered in having to align accurately the various component parts of the transfer gearing so that interference of movement will not occur between the various gears and, on the other hand, will not produce excessive wobble of the shutter element. Also, it has been the practice in the prior art to move the shutter mechanism to either side of a central position when masking and unmasking the two groups of numeral wheels. This entails the minimizing of overtravel, for overtravel in one direction to mask or shield one wheel group will work to the detriment with regard to the exposing of the other group.

Accordingly, one object of the present invention is to provide a counter especially suited for latitude-longitude operations that will not be adversely influenced by manufacturing tolerances customarily employed in the counter art. Stated otherwise, the need for extremely close tolerances is obviated when the teachings of the instant invention are adhered to.

Another object of the invention is to avoid mechanical interference resulting from slightly misaligned parts which occurs in prior art devices.

A further object is to utilize a shutter mechanism in which the overtravel into position for a masking or concealing of one group of wheels will not adversely affect the reading of the wheels.

In the drawings:

Figure 1 is a plan view of the counter, the counter being in other than "zero" position;

Figure 2 is an elevational view corresponding to Figure 1;

Figure 3 is a sectional view taken in the direction of line 3—3 of Figure 2;

Figure 4 is a fragmentary view, partly in section, taken in the direction of line 4—4 of Figure 3;

Figure 5 is a fragmentary sectional view taken in the direction of line 5—5 of Figure 3;

Figure 6:
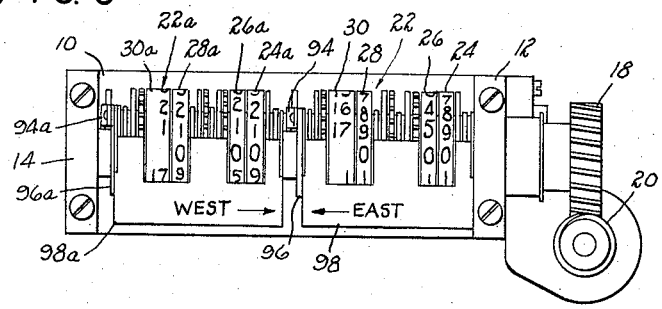
Figure 6 is a plan view similar to Figure 1, but with the counter presenting a "zero" reading.

Referring in detail to the drawings, the counting device selected to illustrate the invention comprises a base plate 10 having at each end thereof a pair of upstanding walls 12, 14 which normally serve to support a windowed cover, the cover in this instance having been removed to show the internal construction of the counter more clearly. In addition to supporting the unshown cover, the end walls 12, 14 journal the ends of a rotatable shaft 16 carrying at one end a worm gear 18 driven by a worm 20.

Encircling the shaft 16 are two groups 22, 22a of wheels having imprinted thereon numerical indicia appearing as degrees and minutes for indicating latitude or longitude from "zero" up to and including 180 degrees, which latter figure is actually represented by the return of the wheels to zero. As shown, each group 22, 22a is comprised of two minute (′) wheels 24, 26 and 24a, 26a, respectively, and two degree (°) wheels 28, 30 and 28a, 30a, respectively. The wheels 24, 24a are suitably secured directly to the shaft 16 for rotation therewith, while the remaining wheels are loosely circumscribed about said shaft and are individually rotated in a manner presently to be described.

Further, the wheels 24, 24a have numbers thereon reading from "0–9" twice the wheels 26, 26a having numbers reading from "0–5" thrice, the wheels 28, 28a reading from "0–9" twice and the wheels 30, 30a reading from "0–17" once. This numbering arrangement gives a fairly uniform distribution of numerals on the various wheels of different orders. By reason of this selected numerical arrangement it will be observed that one revolution of the wheels 24, 24a will indicate 20 minutes, one revolution of the wheels 26, 26a will indicate 180 minutes, i. e. three degrees, one revolution of the wheels 28, 28a will equal 20 degrees, and that one revolution of the wheels 30, 30a will indicate 180 degrees. The only difference between the wheels of the two groups 22, 22a is that the numerals carried by these groups progress in opposite directions, that is to say, when rotatively viewed one group increases numerically while the other decreases, the two groups being designed to rotate in the same angular direction.

Rotatable with the wheels 24, 24a are transfer gears 32, 32a and locking discs 34, 34a, the transfer gears 32, 32a having diametrically disposed pairs of teeth and the locking discs 34, 34a having diametrically disposed single notches, each notch being angularly aligned with the space intermediate the two teeth of each pair on the gears 32, 32a. A fixed transfer shaft 40 carries thereon sleeves 42, 42a, each having a mutilated pinion 44, 44a integral with one end and a regular pinion 46, 46a at the other end. The purpose of the mutilated pinions 44, 44a is to produce a transfer of motion from the transfer gears 32, 32a to the pinions 44, 44a each time a pair of teeth come into engagement therewith, the notches in the locking discs 34, 34a permitting rotation of the pinions 44, 44a only when engagement is made by the transfer gear teeth.

In this manner, assuming a counterclockwise rotation of the shaft 16 when viewed in Figure 3, the wheel 24 will precipitate a transfer action each time it passes from "9" to "0," and by means of spur gear 48, which is in mesh with the pinion 46, the motion will be transferred to the wheel 26 and thus cause it to indicate an increase of "1". This of course happens twice each revolution of the wheel 24. Similarly, the reading on the wheel 26a will be reduced by "1" as this wheel passes from "0" to "9," it being remembered that the numerical sequence of the group of wheels 22a with which this wheel is associated is just the reverse of that employed on the first mentioned group 22, for the spur gear 48a is meshed with the pinion 46a.

Although the aforesaid transfer gearing is old and forms no part of the invention, nevertheless for the sake of completeness the transfer between the wheels 26, 26a and 28, 28a will also be described. To this end the wheels 26, 26a, in addition to the spur gears 48, 48a, also have mounted for rotation therewith transfer gears 50, 50a having three pairs of teeth, each pair spaced 120 degrees from the other, and locking discs 54, 54a having similarly spaced notches which permit mutilated pinions 58, 58a to be rotated only when engaged by one of the pairs of teeth on the transfer gears 50, 50a. The mutilated pinions 58, 58a, of course, loosely surround the shaft 40 and are independent of the sleeve 42, as far as individual rotation is concerned. Integral with the mutilated pinions 58, 58a are regular pinions 60, 60a which are enmeshed with spur gears 62, 62a and in this way cause rotation of the wheels 28, 28a.

Transfer between the wheels 28, 28a and 30, 30a is made in the same manner as between the wheels 24, 24a and 26, 26a, and for this reason a second pair of sleeves 64, 64a is utilized, these sleeves carrying mutilated pinions 66, 66a at one end and regular pinions 68, 68a at their other end. The pinions 66, 66a are cooperable with transfer gears 70, 70a and locking discs 72, 72a, there being two pairs of double teeth diametrically disposed on the gears 70, 70a and two notches similarly placed on the locking discs 72, 72a in angular alignment with the space between each two teeth. A plurality of spacing sleeves 73, each of appropriate length, are utilized as spacers to position properly the various gears supported by the shaft 40.

Coming now to the crux of the invention, the preceding description having been devoted to what is primarily old, rotatable with the highest order wheels 30, 30a are gears 74, 74a, more exactly in this instance termed two-tooth gears since they are each provided with single pairs of teeth 76, 76a. As will be seen from both Figures 3 and 7, the teeth 76 are disposed at an angle of 40 degrees relative to the teeth 76a for a purpose that will be more fully understood when the description of operation is presented. Relatively short shafts 78, 78a are journaled for rotation by upstanding posts on the base plate 10 together with the end wall 14. On the shafts 78, 78a are fixed compound gears 79, 79a having pinion sections 80, 80a and larger gear sections 82, 82a. In order to provide a step-up speed ratio of 1:2, the gear sections 82, 82a are meshed with pinions 84, 84a mounted on a pair of shafts 86, 86a. Rotatable in unison with the pinions 84, 84a is a pair of eccentric members 88, 88a carrying pins 90, 90a which are offset from the axis of rotation for a purpose presently to be explained. The eccentric motion produced by the members 88, 88a as they rotate is transmitted to crank pins 92, 92a by means of connecting links 94, 94a, the pins 92, 92a being carried on discs 96, 96a in an offset relation from the shaft 16 on which the discs 96, 96a are freely pivotal, the discs in this way serving the office of crank elements.

Preferably integral with the discs 96, 96a are arcuate shutter members 98, 98a serving the important function of concealing the group of wheels, any reading of which, if permitted, would be confusing and meaningless. Specifically, what is desired is that the shutter members be moved successively or alternately into dwell positions which conceal and expose the readings on the two wheel groups 22, 22a, and in the structural arrangement selected for purposes of explanation the crank pins 90, 90a are uppermost to open the shutters (Figure 7) and lowermost to close the shutters (Figure 3 shows the shutter 98a so positioned). Of course, the particular positions of the crank pins mentioned above are in turn determined by the angular positions of the two-tooth gears 74, 74a, and in this way the proper sequence of shutter movement is obtained.

To assure that the shutters 98, 98a will always remain in the positions into which they have been moved by the two-tooth gears 74, 74a, locking discs 100, 100a are mounted for rotation with the gears 74, 74a. Like the locking discs previously mentioned in conjunction with the transfer action between pairs of wheels, these locking discs 100, 100a are each provided with a notch aligned with the space intermediate the teeth 76, 76a, and long teeth on the pinion sections 80, 80a engage the notches to permit rotation (and thus cause shutter movement) only when the gears 74, 74a are in mesh with the pinion sections 80, 80a. At all other times the shutters are locked against pivotal movement by engagement of two of the long teeth of the pinion sections 80, 80a against the circular periphery of the locking discs 100, 100a.

Figure 7:
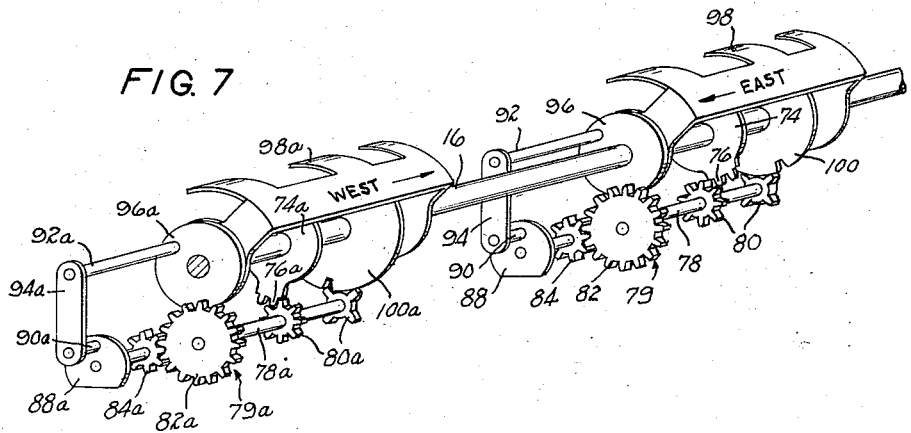
Figure 7 is a perspective view of the device as depicted in Figure 6, the view being greatly simplified to facilitate the description of the manner in which the two shutters are shifted.

Turning now to the operation of the device, reference is first made particularly to Figures 6 and 7. For the sake of discussion it will be assumed that degrees of longitude are to be counted while journeying westward. In the interest of simplicity and to provide a facile understanding, the number wheels have been omitted from Figure 7, together with the transfer gearing between wheels. However, the angular positions of the two-tooth gear 74, 74a corresponds to the position shown in Figure 6, Figure 6 showing the shutters both in an open position to permit the reading of both wheel groups. The wheel groups, as shown, are in a "0—0" position, such as they would assume when traveling west fom the zero meridian. Accordingly, our illustrative journey will be west from the zero meridian to 180 degrees and on through to zero once again.

First of all it is to be distinctly noted that both shutters 98 and 98a are open, thus revealing both groups of numeral wheels for an initial reading. It should also be observed from Figure 7 that the teeth 76a are just approaching engagement with the pinion 80a, whereas the teeth 76 have just become disengaged from the pinion 80. Thus the shutter 98 has just been shifted into open position, and the shutter 98a is just about to be closed. Since each wheel 30, 30a bears eighteen digits, it will require 20 degrees of rotation of the two-tooth gears 74, 74a to move the shutters from a position preventing reading to one permitting reading, although such an angular figure is not critical in the present situation, in contradistinction with the known prior art, inasmuch as there can be any amount of overtravel in a shielding or non-reading direction. For the preceding reason, the teeth 76, 76a are spaced about 40 degrees from each other and, owing to this spacing, both shutters will be open at the zero meridian reading. By the same token, both shutters will be closed at the 180 degree reading, but this is not objectionable.

Continuing with the operational sequence, the passage of the teeth 76a into and out of engagement with the pinion 80a will result in the shutter 98a being pivoted into a concealing position, such position being depicted in Figures 1 to 3. To accomplish this, the wheel 24, 24a will have made thirty revolutions, the wheel 26, 26a three and one-third revolutions, the wheels 28, 28a one-half revolution and the wheels 30, 30a one-eighteenth revolution. With the knowledge of transfer mechanisms between numeral wheels being so widespread, it is thought that the manner in which these wheels are rotated will be readily understood, especially when considered in connection with the discussion given in the early part of this specification.

The two-tooth gear 74 will approach engagement with the pinion 80 when the righthand group of wheels is reading 179°59′ and the change from this reading to a zero reading will result in the shutter 98 being shifted into a shielding or masking position. Since the two-tooth gear 74a has not at this time come into engagement with the pinion 80a, obviously there will be no shifting of the shutter 98a at this moment and it merely remains in a shielding position. Although concealed by the shutter 98a, the lefthand group has been rotated to a meaningless count of 00°01′, while the righthand group is reading 179°59′, and when the wheel progress is continued to 180 degrees (actually reading zero once more) the shutter 98 becomes closed, i. e. moved into shielding position, so that both shutters will then be closed for the 180-degree count. Movement of the lefthand group from 180 degrees (actually a reading of zero) to 179°59′ will cause the two-tooth gear 74a to engage the pinion 80a to open the shutter to expose this set of wheels, and from this point on to the zero meridian the shutter 98a will be open and the decreasing numbers can be read until the zero meridian is reached once more, thus indicating a complete global encirclement. The return to the zero meridian will cause both shutters to be opened and therefore the appearance of Figures 6 and 7 will be again obtained.

From the foregoing, it will be apparent that the individually controlled movement of each shutter obviates any chance of mechanical interference, either by misalignment of the parts or by any difference in backlash present in the respective gearing of the two wheel groups. Also, to be recognized is that the shutters can be moved almost any amount into a closing or shielding position, for any such overtravel of one shutter will in no way adversely affect the opening or exposing position of the other.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

We claim:

In a latitude or longitude counter of the type having two sets of number wheels drivingly connected for operation in the same direction but with the numerals on one set increasing in an opposite direction to the numerals of the other set, a pair of shutters, one for each set of numeral wheels and mounted for oscillating movement between a first position shielding and a second position exposing the associated set of number wheels, and means for sequentially moving the shutters between said positions to alternate the exposure of the sets of number wheels depending upon the number of times the sets of number wheels have been driven through their complete range from initial starting position comprising a pair of rotary members, one for each set of number wheels and its associated shutter, transfer means between each rotary member and the number wheel of highest order of its associated set of number wheels for turning the rotary member one-half turn each time the said number wheel of highest order moves from its highest number to zero and vice versa, and a connecting link between each rotary member and its associated shutter, each link being pivotally connected at one end to the shutter and being eccentrically connected to the rotary member at its other end.

References Cited in the file of this patent

UNITED STATES PATENTS

| 1,439,097 | Graham | Dec. 19, 1922 |
| 2,605,047 | Nyyssonen | July 29, 1952 |

FOREIGN PATENTS

| 29,422 | Great Britain | A. D. 1904 |